(12) United States Patent
Donaldson et al.

(10) Patent No.: US 12,121,827 B2
(45) Date of Patent: Oct. 22, 2024

(54) TOY CONSTRUCTION SYSTEM WITH INTERACTIVE FUNCTION CONSTRUCTION ELEMENTS

(71) Applicant: LEGO A/S, Billund (DK)

(72) Inventors: Thomas Alan Donaldson, Billund (DK); Mark Ross Champkins, Billund (DK); Robert George Milner, Hilton (GB); Andrew James Knights, Huntingdon (GB)

(73) Assignee: LEGO A/S, Billund (DK)

( * ) Notice: Subject to any disclaimer, the term of this patent is extended or adjusted under 35 U.S.C. 154(b) by 445 days.

(21) Appl. No.: 17/427,599

(22) PCT Filed: Dec. 12, 2019

(86) PCT No.: PCT/EP2019/084805
§ 371 (c)(1),
(2) Date: Jul. 30, 2021

(87) PCT Pub. No.: WO2020/156720
PCT Pub. Date: Aug. 6, 2020

(65) Prior Publication Data
US 2022/0118376 A1     Apr. 21, 2022

(30) Foreign Application Priority Data
Jan. 31, 2019   (DK) .......................... PA 2019 70074

(51) Int. Cl.
*A63F 9/24*       (2006.01)
*A63H 33/04*     (2006.01)
(Continued)

(52) U.S. Cl.
CPC ......... *A63H 33/042* (2013.01); *A63H 33/086* (2013.01); *B25J 9/08* (2013.01); *A63H 2200/00* (2013.01)

(58) Field of Classification Search
CPC .... A63H 2200/00; A63H 30/00; A63H 33/04; A63H 33/042; A63H 33/086; B25J 9/08;
(Continued)

(56) References Cited

U.S. PATENT DOCUMENTS 10,456,905 B2    10/2019  Shin
2008/0280682 A1  11/2008  Brunner et al.
(Continued)

FOREIGN PATENT DOCUMENTS

CA    2652721 C    12/2007
CA    2884550 C     4/2009
(Continued)

OTHER PUBLICATIONS

International Search Report and Written Opinion from corresponding international patent application No. PCT/EP2019/084805, mailed Apr. 14, 2020, 9 pages.
(Continued)

*Primary Examiner* — Justin L Myhr
(74) *Attorney, Agent, or Firm* — Day Pitney LLP; George Chaclas; Anthony A. Kassas (57) ABSTRACT

A toy construction system comprising a plurality of toy construction elements including a plurality of function construction elements. The toy construction elements and the function construction elements are detachably interconnected with each other forming a toy construction model. The toy construction model comprising at least a subset of the plurality of toy construction elements; each function construction element comprising a function device adapted to perform a user-perceptible function. The toy construction system further comprises a tag construction element detachably connectable to one or more of the toy construction elements. The tag construction element and the function construction elements are configured for communication of
(Continued)

configuration data from the tag construction element to each of the subset of function construction elements when the tag construction element is connected to a toy construction element. Each function construction element of the subset is configured to control the function device responsive to the communicated configuration data.

19 Claims, 3 Drawing Sheets (51) Int. Cl.
*A63H 33/08* (2006.01)
*B25J 9/08* (2006.01)

(58) Field of Classification Search
CPC .......... A63F 13/22; A63F 13/23; A63F 13/24; A63F 13/245; A63F 2300/1018; A63F 2300/1043; A63F 2300/1062
See application file for complete search history.

(56) References Cited

U.S. PATENT DOCUMENTS

| | | | |
|---|---|---|---|
| 2009/0197658 A1* | 8/2009 | Polchin | A63F 13/245 463/9 |
| 2011/0056238 A1 | 3/2011 | Mak | |
| 2013/0115851 A1 | 5/2013 | Setton | |
| 2013/0217294 A1 | 8/2013 | Karunaratne | |
| 2013/0217295 A1 | 8/2013 | Karunaratne | |
| 2014/0069117 A1 | 3/2014 | Jung et al. | |
| 2014/0069118 A1 | 3/2014 | Jung et al. | |
| 2016/0184701 A1* | 6/2016 | Weston | A63F 13/235 463/42 |
| 2016/0361662 A1* | 12/2016 | Karunaratne | G06F 3/038 |
| 2017/0266558 A1* | 9/2017 | Rath | A63F 13/60 |
| 2018/0193998 A1 | 7/2018 | Shin | |
| 2020/0261818 A1 | 8/2020 | Kærsgaard et al. | |
| 2021/0164728 A1 | 6/2021 | Borisevich et al. | |

FOREIGN PATENT DOCUMENTS

| | | |
|---|---|---|
| CA | 2836505 C | 11/2012 |
| CN | 1906455 A | 1/2007 |
| CN | 103547788 A | 1/2014 |
| CN | 103562536 A | 2/2014 |
| CN | 108292816 A | 7/2018 |
| CN | 109200600 A | 1/2019 |
| EP | 3064258 A1 | 9/2016 |
| EP | 3075425 A1 | 10/2016 |
| FR | 3066248 A1 | 11/2018 |
| FR | 3066249 A1 | 11/2018 |
| HK | 1231429 A1 | 12/2017 |
| JP | 2009-280641 A | 12/2009 |
| WO | WO2007137577 A1 | 12/2007 |
| WO | WO2009047225 A1 | 4/2009 |
| WO | WO2010023070 A1 | 3/2010 |
| WO | WO2013017138 A1 | 2/2013 |
| WO | 2015/173246 A1 | 11/2015 |
| WO | 2016/187517 A1 | 11/2016 |
| WO | 2017/164829 A1 | 9/2017 |
| WO | 2017/213312 A1 | 12/2017 |
| WO | 2018/158357 A2 | 9/2018 |
| WO | WO2018206510 A1 | 11/2018 |

OTHER PUBLICATIONS

First Technical Examination and Search Report issued in corresponding Danish patent application No. PA 2019 70074, mailed Jul. 11, 2019, 9 pages.

International Preliminary Report on Patentability issued in PCT/EP2019/084805, mailed on May 25, 2021, 14 pages.

First Office Action issued in corresponding Chinese Patent Application No. 201980091064.8, mailed May 31, 2022, 7 pages (English translation only).

Intent to Grant issued in corresponding European Patent Application No. 19829025.6, mailed Sep. 9, 2022, 56 pages.

\* cited by examiner

TOY CONSTRUCTION SYSTEM WITH INTERACTIVE FUNCTION CONSTRUCTION ELEMENTS

CROSS-REFERENCE TO RELATED APPLICATIONS

This application is a U.S. National Stage of International Application No. PCT/EP2019/084805, filed on 12 Dec. 2019 and published on 6 Aug. 2020, as WO2020/156720, which claims the benefit of priority to Danish Patent Application No. PA 2019 70074, filed on 31 Jan. 2019. The content of each of the above referenced patent applications is incorporated herein by reference in its entirety for any purpose whatsoever.

FIELD OF THE INVENTION

The invention relates to toy construction systems.

BACKGROUND

Toy construction systems have been known for decades. Over the years, simple box-shaped building blocks have been supplemented with dedicated construction elements with either a specific appearance or a mechanical or electrical function to enhance the play value. Such functions include e.g. motors, switches and lamps, but also programmable processors that accept input from sensors and can activate function elements in response to received sensor inputs.

Self-contained function construction elements exist which have a function device adapted to perform a preconfigured function, an energy source for providing energy to the function device for performing the function, and a trigger responsive to an external trigger event to trigger the function device to perform the function. Typically, such known function construction elements are designed for manual activation of a mechanical trigger and only provide a limited play value.

Moreover, toy construction systems are known that comprise multiple function construction elements that can be assembled with other toy construction elements of the toy construction system so as to create a toy construction model. Such models may exhibit a complex behaviour, in particular when they include several function elements, such as motors, lights, sound devices, etc.

Various methods of programming the behaviour of such models are known.

WO 2009/047225 discloses a toy construction system comprising a plurality of construction elements including one or more function construction elements for performing corresponding functions and including control connection means for communicating with one or more other construction elements. This prior art system further comprises a data processing system providing a graphical programming environment for generating one or more logic commands for controlling the one or more function elements. However, while graphical programming environments are relatively intuitive and easy to use, they still require a certain amount of abstract thinking. Moreover they require the use of a computer or similar device that can execute the programming environment.

WO 2015/173246 discloses that individual function elements may be assigned a particular behaviour by means of tag elements that can be connected to the individual function elements. However, this prior art method requires the user to handle a relatively large number of tags and still requires a relatively high degree of abstract thinking as the user has to break down the desired behaviour of the model into desired functions of the individual function elements, provide and attach the appropriate tags to the individual function elements and then assemble the model using the thus configured tags. Debugging the resulting model behaviour and reconfiguring existing models may also be rather complicated.

Hence, it remains desirable to provide a toy construction system where the user can assemble multiple toy construction elements so as to create a toy construction model and where the resulting behaviour of the toy construction model can be defined in a user-friendly manner. In particular, it is desirable that configuring the resulting toy construction model does not require a high level of abstract thinking and technical insight in order to correctly set up the toy construction model so as to arrive at an assembly with an interesting functional behaviour. Moreover, it is desirable to provide an easy-to-use mechanism to alter the behaviour of an existing toy construction model. It is generally desirable to provide a toy construction system that provides enhanced educational activities and/or play activities.

It is further desirable to provide a toy construction system that provides a high degree of flexibility in designing different toy assemblies with a rich functionality.

Moreover it is desirable to provide a toy construction system that allows users, in particular children, to construct multiple interactive toy assemblies in a user-friendly, efficient, yet flexible and reliable manner without the need for detailed knowledge of control structures, data communication, and how to connect electrical wires, conductors, etc. properly.

Various aspects of embodiments of a toy construction system disclosed herein address one or more of the above needs and/or other needs that exist in the field of toy systems.

SUMMARY

Disclosed herein are aspects of a toy construction system comprising a plurality of toy construction elements, the plurality of toy construction elements comprising a plurality of function construction elements. The toy construction elements, including the function construction elements, are configured to be detachably interconnected with each other so as to form a toy construction model, the toy construction model comprising at least a subset of the plurality of function construction elements, in particular a subset including more than one function construction elements. Each function construction element comprises a function device adapted to perform a user-perceptible function.

The toy construction system further comprises a tag construction element. The tag construction element may be connectable to one or more of the toy construction elements of the toy construction model. In particular, the tag construction element may be one of the plurality of toy construction elements. The tag construction element and the function construction elements are configured for communication of configuration data from the tag construction element to each of the subset of function construction element when the tag construction element is in a proximity of at least a first function construction element of said subset. The first function construction element may be a predetermined one of the subset of function construction elements or it may be any function construction element of the subset, in particular an arbitrary one of the subset, e.g. a user-selected one.

In some embodiments, the proximity is predetermined. The proximity may be defined by a communications range of a direct communication between the tag construction element and the first function construction element, e.g. when the communication is contactless. In some embodiments, the configuration data is communicated from the tag construction element to each of the subset of function construction elements when the tag construction element is connected to a toy construction element of the toy construction model, in particular to the first function construction element or otherwise in close proximity, such as adjacent to or even abutting, the first function construction element e.g. only when the tag construction element is connected to a toy construction element of the model, e.g. only when the tag construction element is connected to the first toy construction element or only when the tag construction element is connected to a toy construction element of the model such that the tag construction element is located in close proximity, such as adjacent to or even abutting, the first function construction element. Each function construction element of the subset is configured to control its own function device, i.e. the function device of said function construction element, responsive to the communicated configuration data.

Accordingly, the configuration data from the tag construction element may be communicated to more than one function construction elements of a toy construction model, such as to all function construction elements of a toy construction model, rather than just used to configure a single function construction element to which the tag construction element is attached. Hence, the behaviour of more than one, such as of all function construction elements included in a toy construction model can be configured by a single tag construction element, thus providing an easy-to-use mechanism for controlling the behaviour of an entire toy construction model, or of a part of the toy construction model, even when the model (or part thereof) includes multiple function construction elements. Accordingly, the toy construction model (or part thereof) may include a plurality, i.e. two or more, function construction elements. Moreover, multiple function construction elements of a toy construction model may be configured in a uniform manner, i.e. based on a common set of configuration data associated with the toy construction model.

This mechanism is particularly useful when one or more function construction elements included in the toy construction model are positioned such that easy access to them is obstructed by other toy construction elements of the model. The tag construction element may be placed on an easily accessible position of the model, e.g. an outwardly, freely accessible surface of the toy construction model.

The configuration data may be communicated from the tag construction element directly or indirectly to each of the function construction elements of the subset. Accordingly, the configuration data is not only stored in a single, central control unit, but is also made available to the other toy construction elements of the subset. In some embodiments, the communicated configuration data is stored in a distributed manner, e.g. by each function construction element of the subset. Thereby, when any of the subset of function construction elements is removed from the toy construction model, the remaining function construction elements may still perform their respective functions and the toy construction model may still exhibit a cooperative behaviour. Similarly, when a new function construction element is added to the subset, e.g. newly attached to the toy construction model, the tag construction element and/or one or more of the other toy construction elements of the subset may communicate the configuration data to the newly attached function construction element. Alternatively or additionally to the distributed storage of configuration data, the function construction elements of the subset and/or the tag construction element may have stored thereon status data or log data indicative of an operational status or operational history of the toy construction model, e.g. data indicative of one or more events that have occurred involving the toy construction model.

In some embodiments, the function construction elements are configured to control their respective function devices responsive to the communicated configuration data only as long as the tag construction element is within a proximity of at least one function construction element of the subset. To this end, the function construction elements may be configured to detect when the tag construction element is no longer within a proximity of at least one function construction element of the subset and, responsive to such detection, stop basing control of their respective function devices on the communicated configuration data.

The function construction elements may detect whether the tag construction element is in a proximity of at least one of the function construction elements in a variety of ways. In some embodiments the configuration data and/or a status signal may intermittently, e.g. periodically, be communicated from the tag construction element directly or indirectly to the function construction elements of the subset. When a function construction element of the subset has not received configuration data or a status signal for a predetermined period of time, the function construction element may determine that the tag construction element is no longer in a proximity of any of the function construction elements of the subset. Alternatively or additionally, the function construction elements may detect whether the tag construction element is connected to the toy construction model, e.g. by detecting and monitoring a relative position and/or orientation of the tag construction element relative to at least one of the function construction elements of the subset. In one embodiment, the detection may e.g. be based on a detection of common or at least correlated movement of the tag construction element and one or more of the function construction elements of the subset. The detection of the correlated movement may be performed as described below.

In alternative embodiments, the function construction elements of the subset may be configured to continue basing control of their respective function devices on the communicated configuration data regardless of whether the tag construction element remains in the proximity of at least one of the tag construction elements of the subset. It will be appreciated that, in such embodiments, the function construction elements may not need to monitor whether or not the tag construction element remains in a proximity of at least one of the function construction elements of the subset.

In some embodiments, the configuration data may include a flag indicative of whether it is applicable even after the tag construction element is no longer in a proximity of at least one of the function construction elements of the subset. Accordingly, depending on the flag, the function construction elements of the subset may either continue or stop basing control of their respective function devices on the communicated configuration data even when the tag construction element is no longer in the proximity of at least one of the function construction elements of the subset.

In some embodiments, the tag construction element is configured to communicate, e.g. to broadcast, configuration data directly to all function construction elements of the subset, e.g. to all function construction elements included in the toy construction model. Accordingly each of the function construction elements of the subset is configured to receive configuration data directly from the tag construction element, e.g. by means of contactless data communication. To this end the tag construction element may broadcast the configuration data to all function construction elements within a configuration range, e.g. within a predetermined range or within a communications range of the communication technology employed. In other embodiments, the tag construction element may detect all tag construction elements in the toy construction model and selectively communicate the configuration data to the detected function construction elements. Alternatively, each of the subset of function construction elements may detect the presence of the tag construction element when the tag construction element is connected to the toy construction model. Each of the subset of function construction elements may thus be configured to configure its behaviour based on the configuration data received from the detected tag construction element.

In other embodiments, the configuration data is indirectly communicated from the tag construction element to at least some of the function construction elements of the subset. To this end, the tag construction element may be configured to communicate the configuration data to a first function construction element of the subset, and the first function construction element may be configured to forward the configuration data to one or more of the other function construction elements of the subset. Again, the configuration data may be communicated directly or indirectly from the first function construction element to each of the remaining function construction elements of the subset. In an embodiment where the communication is indirect, the configuration data may be forwarded from one function construction element of the subset to another function construction element of the subset. It will be appreciated that one or more of the function construction elements may be configured to supplement the configuration data prior to forwarding it, e.g. by adding information about an identity and/or operational state of the forwarding function construction element.

Generally, the communication of the configuration data from the tag construction element to the function construction elements may be performed completely or in part by contactless communication, such as by short-range wireless communication across the toy construction model or by ultra-short range communication between multiple communicating nodes, e.g. from one function construction element to another function construction element.

The term contactless is intended to refer to data transfer from one device to another device without a conductive (galvanic) coupling, i.e. without transfer of electrical energy by means of physical contact via a conductive medium that is conductive for a direct current. It will be appreciated that the term contactless merely characterises the communication and does not exclude that the devices are otherwise physically connected with each other. In particular two toy construction elements may be in physical contact with each other, e.g. mechanically interconnected with each other by means of their respective coupling members, while the communication between them is contactless, i.e. does not rely on the physical contact as a carrier for the transfer of data.

Accordingly, in some embodiments, each function construction element comprises a communications interface for contactless communication with one or more other function construction elements of the plurality of function construction elements and/or with the tag construction element. Similarly, the tag construction element may comprise a communications interface for contactless communication with one or more function construction elements of the subset of function construction elements.

For example, in some embodiments where the configuration data is communicated directly from the tag construction element to each of the function construction elements of the subset, the configuration data may be communicated via short-range communication.

In embodiments, where the configuration data is communicated indirectly from the tag construction element to each of the function construction, i.e. where the communication of the configuration data from the tag construction element to at least some of the function construction elements involves one or more intermediate nodes, the communication may use the same or different technologies at each stage of the path of communication.

For example, the communication between the tag construction element and the first function construction element may be a communication via a physical (galvanic) connection or via an ultra-short range contactless technology, such as a near-field technology, inductive and or capacitive communication. The communication from the first function construction element to the remaining function construction elements may be a short-range contactless communication or it may be along a chain of multiple ultra-short range contactless communication stages or even via physical contacts.

Generally, the communications interface for contactless communication of the function construction elements may implement any suitable contactless communications technology, e.g. using radio-frequency communication in accordance with a suitable communications protocol. In some embodiments, the wireless communications technology is a short-range technology or even ultra-short range communication technology. In some embodiments, some or all of the function construction elements comprise a first communications interface operable for ultra-short-range communication and a second communications interface operable for short-range communication.

The term short-range communications is intended to refer to a communications technology having a communications range larger than the ultra-short-range communications, e.g. a communications range larger than 10 cm, such as larger than 50 cm, such as larger than 1 m. The short-range communications may have a communications range of no more than 100 m, such as no more than 10 m, such as no more than 5 m. In most situations, a communications range of less than 10 m and, in most cases even less than 5 m is sufficient, even though in some embodiments longer ranges may be acceptable or even desirable. The short-range communication may be a radio-frequency communication in a suitable frequency band, e.g. in one of the ISM bands used for short-range communications technology, such as a 2.4 GHz band. The radio-frequency communication may utilise any suitable communications technology for communicating data, such as Bluetooth, IEEE 802.15.4, IEEE 802.11, ZigBee, etc. It will be appreciated, however, that other communications technologies may be used.

The term ultra-short-range communications is intended to refer to communications technologies for contactless and, in particular, wireless communication over a communications range of no more than 10 cm, such as no more than 5 cm, such as no more than 2 cm such as no more than 1 cm, such as less than 1 cm, such as less than 0.5 cm, e.g. between 0.1 mm and 10 cm, such as between 0.1 mm and 5 cm, such as between 0.1 mm and 2 cm, such as between 0.1 mm and 1 cm, such as between 0.1 mm and 0.5 cm. Here and in the following, reference to communications ranges refers to communications ranges under normal operational conditions and in normal operational environments, e.g. inside a child's room. Examples of ultra-short-range communications include near-field communications such as inductive and/or capacitive communication.

In some embodiments the function construction elements may include a transceiver so as to allow two-way communication between different function construction elements.

In some embodiments, the tag construction element and/or one or more, such as each, of the subset of function construction elements is configured to detect one or more, such as each, of the function construction elements of the subset, e.g. of all the function construction elements in a model or of all function construction elements included in a model that are within a predetermined proximity of a first function construction element.

This detection preferably uses a mechanism that allows detection of all function construction elements in a model, even if some or all of the function construction elements are physically separated from each other, e.g. by one or more conventional toy construction elements, i.e. by toy construction elements without electronic elements, conductive parts, etc.

In one embodiment, the detection may e.g. be based on a detection of common or at least correlated movement of the function construction elements of the subset. As the function construction elements of the subset are part of a coherent model, they all perform correlated movements when the toy construction model as a whole is moved in space.

For example, the function construction elements may include respective accelerometers and/or other motion detectors and the system may be configured to detect correlations between the motion patterns of the respective function construction elements, such as concurrent motions. To this end, some or all function construction elements may exchange information about their respective detected motions with each other, e.g. via contactless, such as via short-range communication. Some or each of the function construction elements may thus include a processor configured to determine which other function construction elements are part of the same coherent structure, thus determining the members of the subset.

Alternatively, some or all of the function construction elements may communicate data indicative of their motion to a central processor, e.g. to a processor of one of the function construction elements or the processor of an external data processing device. The central processor may then determine the function construction elements of the subset and communicate this information back to the function construction elements of the subset.

Alternatively or additionally, the system may utilize that the relative positions and/or orientations of the function construction elements are invariant when the toy construction model as a whole is moved about. For example, the relative distances between the function construction elements remain constant when the model as a whole is moved about. Accordingly, each function construction element may be configured to detect the relative distances (and/or another suitable relative position coordinate) and/or relative orientations of one or more of the other function construction elements during a detected motion. The motion may e.g. be detected by an accelerometer, a magnetometer for measuring the geomagnetic field, and/or the like. The function construction element may then determine all other function construction elements that have a constant distance and/or relative orientation compared to said function construction element and determine the thus detected function construction elements as members of the same subset, i.e. of the same toy construction model. Function construction elements may measure relative position and/or orientation coordinates in a variety of ways, e.g. as disclosed in co-pending international patent application no. PCT/EP2019/084779, the entire contents of which are hereby included herein by reference.

For example, a user may be instructed to attach the tag construction element to a toy construction model and then move the model as a whole, so as to allow the function construction elements and/or tag construction element to detect each other as a part of the same toy construction model.

In some embodiments, the tag construction element only communicates the configuration data to a first function construction element of the subset when the tag construction element is positioned within a proximity of the first function construction element, e.g. directly adjacent to the first function construction element, e.g. within a communications range of an ultra-short range communications from the first function construction element, such as a range of a near-field data exchange from the first function construction element, such within a communications range of an inductive and/or capacitive data exchange from the first function construction element, such as in physical contact with the first construction element. Accordingly, it may be ensured that the configuration data is only communicated when the tag construction element is actually connected to the toy construction model. In some embodiments, the user may attach the tag construction element to any function construction element of the subset, i.e. each function construction element may play the role of the first function construction element. In particular, the tag construction element may be operable to communicate the configuration data to any arbitrary function construction element of the subset as long as the tag construction element is positioned within a sufficient proximity of said arbitrary function construction element of the subset.

The behaviour of the function construction elements of the subset may be determined based on the configuration data in a variety of ways. Each function construction element may be configured to control its function device responsive to the configuration data received from the tag construction element. The configuration data may e.g. be indicative as to how the function construction element is to react to certain sensor inputs or other stimuli, e.g. which sounds to play, etc. The specific manner in which each function construction element controls its respective function device may vary from function construction element to function construction element even when they all receive the same configuration data. For example, different function construction elements may include different function devices and/or different sensors. Moreover, they may control their behaviour based on other parameters, e.g. based on their measured relative position and/or orientation relative to the other function construction elements of the subset, based on a history/log of previous received data, etc.

In some embodiments, each function construction element of the subset may be operable to perform at least one function autonomously, i.e. regardless as to whether the subset includes other function construction elements and regardless which other function construction element(s), if any, are included in the toy construction model. It will be appreciated, that the autonomously performed function may depend on the configuration data. In some embodiments, all functions performed by each function construction element of the subset may be independent of the presence of the type of the other function construction elements in the subset. Alternatively, in other embodiments, one or more functions of the function construction element may indeed depend on which other function construction elements are present in the subset. However, even in the latter embodiment, the function construction element may preferably perform at least one function regardless of the presence of other function elements in the subset. Accordingly, in the embodiments mentioned above as well as in some other embodiments, a toy construction model comprising one or more function construction elements is operable to exhibit at least one user-perceptible behaviour regardless of how many and which function construction elements are included in the model. In particular, no central hub or control construction element is required.

Accordingly, in some embodiments, the tag construction element and/or the function construction elements are configured, when a new function construction element is added to the toy construction model, to communicate the configuration data to the new function construction element, and wherein the new function construction element is configured to control the function device of said new function construction element responsive to the communicated configuration data.

Similarly, when any function construction element is removed from the toy construction model, the remaining function construction elements of the subset may be configured to continue controlling their respective function devices responsive to the configuration data.

The tag construction element may comprise a memory for storing the configuration data.

Generally, the configuration data may include one or more parameters or settings configured to be used by a control routine, e.g. a control program, executed by a control circuit of the function construction element. The transmitted configuration data may comprise an identifier causing each function construction element of the subset to control its respective function device responsive to the received identifier. For example, each function construction element may comprise a memory having stored executable instructions. In particular, each function construction element may have stored a set of alternative instructions, each resulting in a different behaviour and each being associated with a respective identifier. Each function construction element may thus select one of the set of alternative instructions based on the received identifier. Alternatively or additionally, the configuration data may comprise configuration parameters (e.g. sound data, data indicative of a motion pattern, etc.) and/or program code for controlling the function device. The configuration data may be model configuration data which represents a behaviour of the toy construction model as a whole, e.g. define the model behaviour as a specific model type, e.g. a "police car", a "dragon", a "fire station", a "star ship" etc. The model configuration data may thus be independent on the specific function construction element and be generic for all function construction elements of the model. In particular, the configuration data received by each function construction element may include the same model configuration data; to this end, all function construction elements of the subset may receive the same configuration data. The function construction elements included in the model may be configured to determine a respective element behaviour of the individual function construction element based on the received configuration data, i.e. each function construction element may be configured to determine an element-specific behaviour specific to the particular function construction element based on the model configuration data. In addition to being based on the received model configuration data, the determination of the respective element-specific behaviours of the individual function construction elements may further depend on one or more additional parameters, in particular on one or more element-specific parameters specific to respective function construction element, such as one or more of the following: the type of function device of the function construction device, a set of available pre-programmed behaviours implementable by the function construction element, a detection/identification by the function construction element of other function construction elements in the model, sensor inputs received by a sensor of the function construction element, and/or the like.

It will be appreciated that, in some embodiments, it may be possible to attach two or more tag construction elements to a toy construction model. In such an embodiment, respective configuration data from each tag construction element attached to the toy construction model may be communicated to each function construction element of the toy construction model. The function construction elements of the toy construction model may thus control their respective function device responsive to the configuration data received from all tag construction elements attached to the toy construction model.

Each function construction element may be configured to transmit an identification signal to one or more of the other function construction elements of the subset, e.g. via the short-range communication. Hence, the behaviour of the function construction elements of the subset may further be made dependent on the presence/identity of one or more other function construction elements as part of the subset. Consequently, the function construction elements may be controlled to exhibit a relatively complex behaviour, including cooperative behaviour without requiring the user to have advanced technical or programming skills.

The identification signal may be indicative of a type of function construction elements and/or of one or more operational parameters of the function construction element transmitting the signal. It will be appreciated that the identification signal may be transmitted in a number of ways, e.g. as a broadcast signal; the identification signal may be transmitted periodically by each function construction element and/or responsive to a trigger event. For example, the identification signal may be a response signal transmitted responsive to a request or inquiry signal from another function construction element.

In some embodiments, a function construction element is configured to detect a type and/or identity of one or more other function construction elements in a proximity of the function construction elements, e.g. of the function construction elements of the subset; and to control the function device of said function construction element responsive to the detected type and/or identity. Hence, the behaviour of a function construction element may be made dependent on which other function construction elements are within a proximity, e.g. part of the same toy construction model.

For example, the function construction element may have stored thereon multiple programs or multiple functional patterns and select one or more of these programs/patterns responsive to the type and/or identity of the other function construction elements within a proximity and/or within the same toy construction model. For example, each function construction element may comprise a data structure, e.g. a list or matrix or a database of executable instructions, program blocks, functions, subroutines or the like associating one or more sets of interactive construction elements with respective executable instructions, program blocks, etc. It will be appreciated that the list, matrix or database may include pointers such as memory addresses, identifying to instructions, program blocks, functions etc.

When a function construction element has detected all function construction elements (in its proximity and/or within the same toy construction model) of one of the sets to which a set of instructions, a program block, or the like, is associated, the function construction element selects and executes the associated instructions/program block/function etc. Hence, function construction elements may be configured to reference a stored set of instructions or program block of the program data structure corresponding to the detected function construction elements. The behavior of a function construction element may thus be made dependent on which other function construction elements are present in a proximity of and/or within the same toy construction model as the function construction element. In some embodiments, the selection of an executable set of instructions may be made responsive to the configuration data received from the tag construction element. It will be appreciated that the function construction element may be controlled by firmware. The firmware may comprise respective sets of instructions that correspond to respective behavior.

In some embodiments, one or more of the function construction elements comprise a sensor responsive to a predetermined sensor input; and the function construction element is adapted to control its function device based on the received sensor input. Examples of sensor inputs include a mechanical force, a push action, a tilt orientation, a pull action, a rotation, a human manipulation, a touch, a proximity of an object, an electrical signal, a radio frequency signal, an optical signal, a visible light signal, an infrared signal, a magnetic signal, a temperature, a humidity, a radiation.

The user-perceptible function may e.g. be a motion, a generation of an audible sound signal, a generation of a visible light signal, and/or the like.

Each function construction element may further comprise an energy source, such as a rechargeable energy source, e.g. a rechargeable battery, for providing energy to the function device for performing the controllable function.

Generally, toy construction systems often allow a large variety of different toy construction models to be constructed from a limited number of different types of toy construction elements, each toy construction model having a different physical configuration as defined by the spatial arrangement of the toy construction elements within the toy construction model. Generally, the term toy construction element refers to the smallest elements of the toy construction system that cannot be disassembled into smaller elements during normal use and, in particular, not be disassembled in a non-destructive manner and/or without the use of tools.

Some or all of the toy construction elements may be function construction elements which include a function device as described herein. In particular in some embodiments, only some of the toy construction elements are function construction elements that include a function device. Accordingly, in some embodiments, the toy construction system further comprises a plurality of other toy construction elements, in particular, non-electronic and/or non-interactive toy construction elements, such as conventional toy construction elements, e.g. consisting of a moulded plastic element or an element made in a different manner and/or from another suitable material such as wood, without any electronic components. In some embodiments the toy construction system comprises different types of function construction elements, e.g. including different types of function devices, with or without a sensor, etc.

Each toy construction element of the toy construction system and, in particular, each function construction element, may comprise coupling members configured to engage coupling members of other toy construction elements of the toy construction system so as to detachably attach the toy construction elements to each other. To this end, the coupling members may utilize different coupling mechanisms, e.g. based on frictional engagement of the coupling members with each other, based on screws, plug-and-socket connections or other forms of mating engagements of cooperating coupling members.

Hence, toy construction elements that have been interconnected with each other by means of the coupling members can again be disconnected from each other such that they can be interconnected again with each other or with other toy construction elements of the system, e.g. so as to form a different spatial structure. In some embodiments, the toy construction elements are provided with a first and a second type of coupling members, such as coupling pegs and peg-receiving recesses for frictionally engaging the pegs, or other pairs of mating or otherwise complementary coupling members configured to engage each other so as to form a physical connection. One type of coupling members may be located on one side, e.g. the top side, of the toy construction element while another, complementary type of coupling members may be located on an opposite side, e.g. the bottom side, of the toy construction element. In some embodiments, the toy construction elements include pegs extending from the top face of the toy construction element and corresponding peg-receiving cavities extending into the bottom face of the toy construction element for frictionally engaging the pegs by a suitable clamping force.

Generally, the toy construction system may impose limitations on the degrees of freedom of how the toy construction elements may be attached to each other, e.g. by limiting the possible relative positions and/or orientations at which they can be attached to each other. These limitations facilitate the detection of relative positions and/or orientations of function construction elements within a toy construction model.

To this end, the coupling members may be positioned on grid points of a regular grid; in particular, the coupling members of the toy construction elements may be arranged such that the coupling members of a set of mutually interconnected toy construction elements are positioned on grid points of a three-dimensional regular grid. The dimensions of the toy construction elements may be defined as integer multiples of a unit length defined by the regular grid. It will be understood that a three-dimensional grid may be defined by a single unit length, by two unit lengths, e.g. one unit length applicable in two spatial dimensions while the other unit length is applicable in the third spatial dimension. Yet alternatively, the three-dimensional grid may define three unit lengths, one for each spatial dimension.

In some embodiments, the toy construction elements are made from plastics material, e.g. thermoplastic polymers, or from another suitable material. The toy construction elements may e.g. be made by an injection molding process or by another suitable manufacturing process.

Each function construction element may comprise a housing. A function device and, optionally, other electronic components such as a sensor and/or a control circuit are accommodated within said housing. The housing may be box-shaped. The housing may define a top face and a bottom face, opposite the top face. At least some of the coupling members may extend from the top face. The housing may further comprise one or more side faces extending between the top and bottom faces.

Embodiments of the toy construction system described herein provide a distributed control system where function devices and, optionally, sensors are provided in function construction elements. Control of the function devices is performed by control circuits integrated into some or all of the function construction elements and/or into separate control toy construction elements. The compactness and modularity further increases the flexibility in which the function construction elements can be incorporated into even relatively small toy construction models. In some embodiments, the housing of a function construction element has a height (excluding the protruding coupling members) of between 3 mm and 10 mm, such as between 3.2 mm and 9.6 mm, such as 3.2 mm or 6.4 mm or 9.6 mm. The length and width of the housing may each be between 5 mm and 35 mm, such as between 8 mm and 32 mm, such as 8 mm, 16 mm, 24 mm or 32 mm. For example the lateral dimensions may be 16 mm×16 mm or 16 mm×24 mm or 16 mm×32 mm. It will be appreciated, however, that other dimensions may be selected.

In some embodiments, the tag construction element also comprises coupling members corresponding to the coupling members of the function construction elements. In some embodiments the tag construction element may be a conventional toy construction element to which a tag has been applied, e.g. a near-field readable memory tag, e.g. in the form of an adhesive sticker. In some embodiments, the tag is permanently integrated into the tag construction element, e.g. embedded into the material of the tag construction element, enclosed in a void defined by the tag construction element and/or the like. In any event, the tag construction element may comprise a memory having stored thereon configuration data and a data exchange circuit for communicating the configuration data from the memory to one or more of the function construction elements. In some embodiments, the configuration data is stored in in a read-only manner. In other embodiments, the configuration may be altered, e.g. by a program executed on a computer or other data processing device that includes a communication interface configured to send modified configuration data to the tag construction element for storage thereon. Some embodiments of tag construction elements may be passive, i.e. without own power supply. For example, the tag construction element may comprise a passive RFID tag or other circuitry configured to be read out by a function construction element responsive to an interrogation signal from the function construction element without the need of any internal power supply of the tag construction element, i.e. the interrogation signal may provide all necessary processing power for energizing the tag construction element.

The present disclosure relates to different aspects including the toy construction system described above and in the following, corresponding function construction elements and other apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

According to another aspect, disclosed herein are embodiments of a method for controlling a behaviour of a toy construction model constructed from a plurality of toy construction elements, the plurality of toy construction elements comprising two or more function construction elements, each function construction element comprising a function device adapted to perform a user-perceptible function; the method comprising:
- communicating configuration data from a tag construction element to each of the two or more function construction elements when the tag construction element is in a proximity of at least one of the function construction elements; and
- controlling the respective function device of each function construction element of said two or more function construction elements responsive to the communicated configuration data.

In some embodiments, the toy construction model further comprises the tag construction element attached to one or more of the toy construction elements of the toy construction model.

According to another aspect, disclosed herein are embodiments of a method for controlling a behaviour of a toy construction model constructed from a plurality of toy construction elements, the plurality of toy construction elements comprising two or more function construction elements, each function construction element comprising a function device adapted to perform a user-perceptible function, the toy construction model further comprising a tag construction element attached to one or more of the toy construction elements of the toy construction model; the method comprising:
- communicating configuration data from the tag construction element to each of the two or more function construction elements; and
- controlling the respective function device of each function construction element of said two or more function construction elements responsive to the communicated configuration data.

According to yet another aspect, disclosed herein are embodiments of a function construction element of a toy construction system; the function construction element comprising one or more communications interfaces, a function device operable to perform a user-perceptible function, and a control circuit configured to control the function device; the control circuit being configured to:
- receive configuration data from a tag construction element via at least one of the one or more communications interfaces;
- forward, via at least one of the one or more communications interfaces, said configuration data to one or more other function construction elements with which the function construction element is directly or indirectly detachably interconnected so as to form a toy construction model; and
- control the function device responsive to the received configuration data.

DETAILED DESCRIPTION

Various aspects and embodiments of toy construction systems disclosed herein will now be described with reference to toy construction elements in the form of bricks. However, the invention may be applied to other forms of construction elements for use in toy construction sets.

Figure 1:
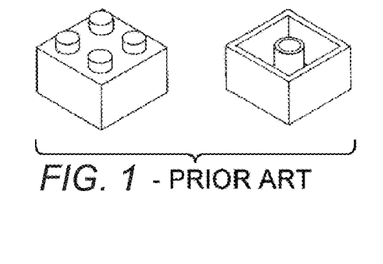
FIGS. 1-3 each show a prior art toy construction element.
Figure 2:
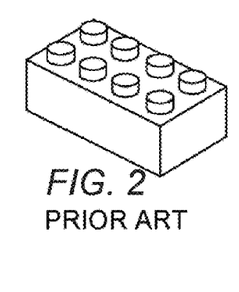
Figure 3:
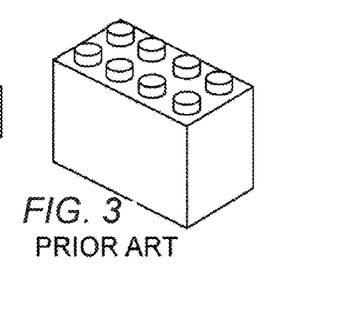

FIG. 1 shows a toy construction element with coupling pegs on its top surface and a cavity extending into the brick from the bottom. The cavity has a central tube, and coupling pegs on another brick can be received in the cavity in a frictional engagement as disclosed in U.S. Pat. No. 3,005,282. FIGS. 2 and 3 show other such prior art construction elements. The construction elements shown in the remaining figures have this known type of coupling members in the form of cooperating pegs and cavities. However, other types of coupling members may also be used in addition to or instead of the pegs and cavities. The coupling pegs are arranged in a square planar grid, i.e. defining orthogonal directions along which sequences of coupling pegs are arranged. The distance between neighbouring coupling pegs is uniform and equal in both directions. This or similar arrangements of coupling members at coupling locations defining a regular planar grid allow the toy construction elements to be interconnected in a discrete number of positions and orientations relative to each other, in particular at right angles with respect to each other. The toy construction elements shown here, in FIGS. 1-3, are of the passive type, without additional functionality beyond mechanical model building, such as electromagnetic, electronic, optical, or the like.

Figures 4A, 4B, 5:
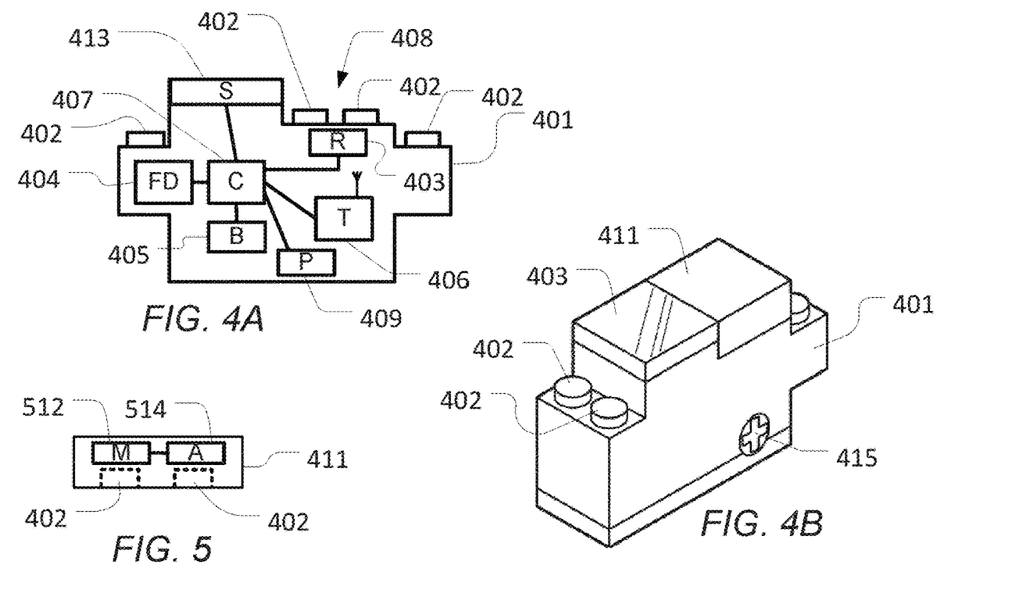
FIGS. 4A-B show an embodiment of a function construction element of a toy construction system as disclosed herein.
FIG. 5 shows a schematic block diagram of an example of a tag construction element.

FIGS. 4A-B show an example of a function construction element 401. In particular, FIG. 4A shows a schematic block diagram of the function construction element while FIG. 4B shows a perspective view of the function construction element. The function construction element is generally shaped as an orthogonal polyhedron with flat side faces and having coupling members 402 extending from its upper surfaces and cavities extending into its bottom surfaces (not explicitly shown). However other shapes and sizes of construction elements may be used, e.g. shapes an sizes shown in FIGS. 1-3 or yet other shapes and sizes. The coupling members are arranged in planar, regular, parallel grids defining the coupling locations.

The function construction element 401 comprises a control circuit 407, e.g. a microcontroller, a microprocessor, or other suitable processing unit. The function construction element 401 further comprises a function device 404 connected to the control circuit 407 and, optionally, a sensor 413 connected to the control circuit. The function construction element 401 further comprises a transceiver 406 connected to the control circuit and operable for radio-frequency communication with other function construction elements. The function construction element further comprises a rechargeable battery 405 or other suitable power source, for providing power to the control circuit, the function device, the sensor and the transceiver. The function construction element further comprises a tag reader 403 for reading configuration data from a tag construction element 411 when the tag construction element is detachably connected to the function construction element, e.g. connected at a predetermined attachment location 408. FIG. 4A shows the function construction element without a tag construction element attached while FIG. 4B illustrates the function construction element with a tag construction element 411 attached, e.g. a tag construction element as shown in FIG. 5. The function construction element 401 further comprises an element detection circuit 409 operable to detect other function construction elements in the same toy construction model as function construction element 401. The walls of the function construction element 401 define a housing which accommodates the processing unit 407, the function device 404, the battery 405, the sensor 413, the tag reader 403, the element detection circuit 409 and the transceiver 406.

The control circuit 407 is configured to control the function device responsive to configuration data read from a tag construction element 411 attached to the attachment location 408 and, optionally, based on an input from the sensor 403 and/or from the element detection circuit 409.

The function construction element is configured to forward, via transceiver 406, configuration data read from the tag construction element 411 by the tag reader 403 to other function construction elements in a proximity of the function construction element 401, e.g. to all function construction elements detected by element detection circuit 409 as included in the same toy construction model as function construction element 401 and/or to all function construction elements within a predetermined range from the function construction element 401.

The function construction element 401 is further configured to receive, via transceiver 406, identification signals from other interactive construction elements, and to broadcast identification signals. The transceiver 406 may be operable to transmit and receive radio-frequency signals in a suitable frequency band, e.g. in one of the ISM bands used for short-range communications technology. In fact the radio-frequency communication may utilise any suitable communications technology for communicating data, such as Bluetooth, IEEE 802.15.4, IEEE 802.11, ZigBee, etc. It will be appreciated, however, that other communications technologies may be used such as other contactless communication technologies.

The function device may be any suitable device for performing a function that provides a user-perceptible effect, such as a visible or audible effect. In the example of FIG. 4B, the function device is a motor (not explicitly shown in FIG. 4B) and the function construction element 401 comprises a coupling member 415 for receiving a shaft that may be rotatably driven by the motor. Other examples of function devices may include any suitable mechanical and/or electrical device, arrangement or circuitry adapted to perform one or more mechanical or electrical function that provides a user-perceptible effect, such as a visible or audible effect.

Examples of a mechanical function that the function construction elements described herein can perform include driving a rotating output shaft, winding-up a string or a chain which enables pulling an object closer to the function construction element, moving a hinged part of the function construction element which enables e.g. opening or closing a door, ejecting an object, rotating a turntable, moving a linear actuator, etc. Such mechanical motions can be driven by an electric motor powered by a (rechargeable) battery or a rechargeable electric capacitor, or another suitable power source.

Examples of an electrical function that the function construction elements described herein can perform include emitting constant or blinking light, activating several lamps in a predetermined sequence, emitting audible sound such as beep, alarm, bell, siren, voice message, music, synthetic sound, natural or imitated sound simulating and stimulating play activities, providing visible output via a display, etc.

Hence, examples of function devices include a light source such as a lamp or LED, a sound generator, a motor, a hinged part, a rotatable shaft, a linear actuator, a display, or the like. A toy construction system may comprise several of such function construction elements providing different functions.

The tag reader 403 may be an RFID/NFC reader or any other circuitry for reading data from a tag construction element 411 when the tag construction element is attached to the attachment function location 408 of the function construction element 401, or is otherwise positioned in sufficient proximity of the tag reader 403. The tag reader is configured to read the data in a contactless manner, e.g. via inductive and/or capacitive data exchange. Alternatively to a contactless tag reader, the function construction element may comprise an electrical connector allowing a tag construction element 411 to be electrically connected to the control circuit so as to allow the control circuit to receive configuration data, such as an identifier and/or other data, from a memory of the tag construction element 411. In the example of FIG. 4A the tag reader is shown proximate to an attachment position where the tag construction element may be attached directly to the function construction element. In other embodiments, the tag reader may be located at a different position, e.g. next to a side wall or other wall of the function construction element where there are no coupling members. In such embodiments, the tag reader may be configured to read data from a tag construction element when the tag construction element is positioned adjacent to said side wall or other wall, as the case may be.

The control circuit 407 controls operation of the function device 404 responsive to the configuration data received from the tag construction element 411. Alternatively or additionally, the control circuit may enter respective operational modes responsive to the configuration data received from the tag construction element. Similarly, the function construction element 401 may receive configuration data via the transceiver 406 from another function construction element, in particular configuration data which the other function construction element has read from a tag construction element and has forwarded via a transceiver of the other function construction element. The control circuit 407 may thus control operation of the function device 404 responsive to such configuration data received from another function construction element, e.g. in addition to configuration data read from the tag construction element 411 or alternative to such directly read data, e.g. when no tag is attached to function construction element 401.

In some embodiments, the control circuit 407 may be configured to only use configuration data received from another function construction element, when the configuration data was received from a function construction element detected as being part of the same toy construction model as the function construction element 401. This determination may e.g. be made based on input from the element detection circuit 409 and/or based on identification data received via the transceiver 406.

In the example of FIG. 4B, the sensor 403 is a light sensor, e.g. including a light-sensitive diode. Other examples of a sensor include a microphone, an accelerometer, a gyro, a linear or rotation encoder, a proximity sensor, and/or the like. The control circuit 407 may thus be operable to control the behaviour of the function construction element 401 responsive to input sensed by the senor. For example, in the example of FIG. 4B, the control circuit may control the speed of the motor responsive to the sensed light intensity by the light sensor 403. The specific behaviour of the function construction element, i.e. the specific way of reacting to different sensor inputs, may be configured by the received configuration data, i.e. the configuration data may be indicative of how the function construction element reacts to respective sensor inputs. It will be appreciated that the behaviour of the function construction element may be determined by other conditions in addition to the configuration data, e.g. by the number, identity, relative position/orientation of other function construction elements in the vicinity (e.g. within the same toy construction model) as the function construction element.

The element detection circuit 409 is adapted to provide position signals representative of the respective positions of one or more other function construction elements relative to function construction element 401, e.g. relative distances between the function construction element 401 and respective other function construction elements. To this end, the element detection circuit 409 is operable to interact with other function construction elements in order to provide a position signal that allows the control circuit 407 to determine whether the other function construction elements are part of the same toy construction model. Using this position signals, the control circuit 407 may then selectively use received configuration data from one or more of the other function construction elements, depending of said other function construction element is determined to be part of the same toy construction model as function construction element 401.

For example, the position signal may include relative position information, or distance information, between the function construction element 401 with respect to one or more of the other function construction elements of a toy construction model. Preferably, the position signal furthermore also includes information about a relative orientation of the function construction element 401 with respect to one or more of the other function construction elements. Furthermore, the position signal may also include an absolute position of the function construction element 401 in an external reference coordinate system, a so-called fixed or invariant coordinate system. Using the position signal then allows for modelling a geometric relation between the function construction elements of a toy construction model. An example of a method of detecting relative positions and orientations of other function construction elements, and of determining whether such function construction elements are part of the same toy construction model, is disclosed in co-pending international patent application no. PCT/EP2019/084779 The detection may be based on the measurement of a magnetic field generated or modified by the other function construction elements. For example, during an element detection cycle, each function construction element may generate a magnetic field, e.g. a time-varying magnetic field, that is detectable by other function construction elements. Concurrently (or otherwise in association) with creating the magnetic field, the field-generating function construction element may broadcast, via its transceiver, an identifier identifying the function construction element. Alternatively, a specific time-variation of the magnetic field may encode the identifier.

A number of suitable detection mechanisms may be used for detecting and/or identifying other function construction elements. For example, each function construction element may, while activated, periodically broadcast identification signals such as identification messages including information such as its operational mode, an element ID and/or a type identifier identifying the type of function element, e.g. which type of function device or sensor it comprises. The element detection circuit of each function construction element may also create a time varying magnetic field, e.g. by an electromagnetic coil included in the function construction element, so as to allow other function construction element detect the position and/or orientation based on a measurement of the strength and/or direction of the generated magnetic field. To this end, the element detection circuit of each function construction element may include one or more electromagnetic coils for detecting changes in a magnetic field and/or one or more magnetometers and/or the like.

It will be appreciated that a variety of other recognition mechanisms may be employed allowing function construction elements to obtain information about which other interactive construction elements are in its proximity, e.g. part of the same toy construction model.

The function construction elements may be used as a part of a toy building set comprising construction elements with coupling members for detachably interconnecting construction elements, e.g. the known bricks shown in FIGS. 1-3. A toy construction set may comprise a plurality of function construction elements and a plurality of passive toy construction elements.

FIG. 5 shows a schematic block diagram of an example of a tag construction element. The tag construction element 411 comprises a housing having coupling members 402 for detachably attaching the tag construction element 411 to other toy construction elements of the toy construction system, e.g. to an attachment location of a function toy construction element. For example, the tag construction element may be compatible with and of a similar general shape as the toy construction elements shown in FIGS. 1-3. The tag construction element further comprises a memory 512 for storing configuration data. The configuration data may simply be an identifier representing a particular model behaviour. Alternatively or additionally, the configuration data may include additional information, e.g. information encoding sound data, a light sequence, a motion sequence, etc. The tag construction element further comprises a data exchange interface 514, such as an antenna, a capacitive interface, an inductive interface and/or the like operable to allow a tag reader to read out the configuration from the memory in a contactless manner. Alternatively, the data exchange interface may be an electric (galvanic) contact or in another manner.

Figure 6:
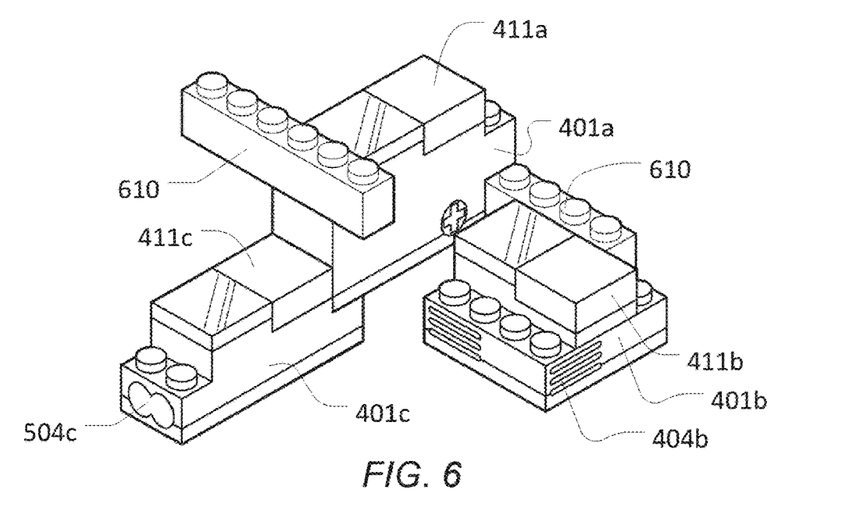
FIG. 6 shows an embodiment of a toy construction model constructed from toy construction elements and, in particular, function construction elements and tag construction elements.

FIG. 6 shows an example of a toy construction model constructed from toy construction elements and, in particular, from function construction elements as disclosed herein. The toy construction model of FIG. 6 is constructed from two conventional toy construction elements 610 (similar to the elements shown in FIGS. 1-3) and from three function construction elements 401a-c as described herein.

In this example, function construction element 401a comprises a motor (not explicitly shown), e.g. as described in connection with FIG. 4B, while function construction element 401b comprises a sound source 404b and function construction element 401c comprises a light source 404c.

In the example, of FIG. 6, each of the function construction elements has attached to it a tag construction element 411a-c, respectively. During operation, the behaviour of function construction elements 401a-c is configured by configuration data which each of the function construction elements reads from the respective tag construction element attached to it. It will be appreciated that, if the user wishes to change the overall behaviour of the toy construction model, it may be tedious to replace all tag construction elements by other such elements having stored thereon different configuration data representing a different behaviour. This may particularly be the case when the user wishes to reconfigure the behaviour of larger toy construction models that include a larger number of function construction elements or function construction elements that are surrounded by other toy construction elements and thus difficult to access without at least partly disassembling the model.

In embodiments of the toy construction system disclosed herein, the tag construction element and the function construction elements are configured for communication of configuration data from the tag construction element to each of the function construction elements included in the toy construction model when the tag construction element is connected to a toy construction element of the toy construction model. Accordingly, it is not necessary to attach a tag construction element to each individual function construction element in order to configure or re-configure the behaviour of the entire toy construction model. Moreover, the model behaviour may be changed in a consistent manner by attaching a single tag construction elements to the toy construction model, e.g. to one of the function construction elements.

Figures 7A, 7B, 7C:
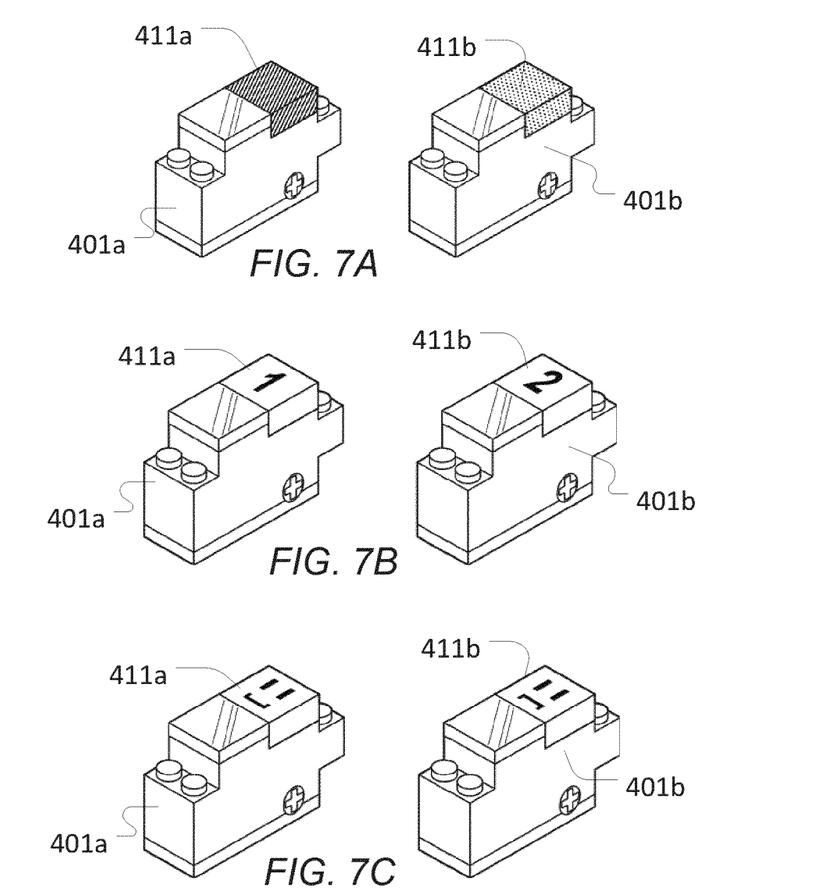
FIGS. 7A-C illustrate examples of function construction elements having attached thereto respective tag construction elements.

FIGS. 7A-C illustrate examples of function construction elements having attached thereto respective tag construction elements. The different examples illustrate that the tag construction elements may have a design, e.g. carry an insignia, that indicates the behaviour represented by the configuration data stored on the tag construction element. FIGS. 7A-C each shows two function construction elements 401a, b, respectively, each function construction element having a different tag construction element 411a, b, respectively, attached to it.

For example, the tag construction elements shown in FIG. 7A, have tag construction elements of different colors attached to it where the respective colors represent the different behaviour caused by the configuration data stored on the respective tag construction elements.

In the example of FIG. 7B, the tag construction elements are marked with respective identifiers indicative of a the behaviour represented by the respective tag construction elements.

In FIG. 7C, the tag construction elements comprise data defining a behavioural pattern or mood, and the function construction elements may be configured to control their function devices so as to emulate the behavioural pattern identified by the tag construction element connected to it. Examples of behavioural patterns may include angry, happy, sad, tired, "police car", etc. Such patterns may be expressed by the parameters of the function performed by the function devices, e.g. by the volume, pitch or types of sounds played, by the speed and/or movement pattern of a motor, etc. Function construction element 401a has a tag construction element 411*a* attached to it that has an identifier or data stored on it causing the function construction element 401*a* and other function construction elements included in the same toy construction model as function construction element 401*a* to emulate a "happy" behaviour or mood. Function construction element 401*b* has an identifier or data stored on it causing the function construction element 401*b* and other function construction elements included in the same toy construction model as function construction element 401*b* to emulate a "sad" behaviour or mood.

It will be appreciated that in some of the above uses a simple identifier may suffice to identify the operation state identified by the tag construction element. In other embodiments it may be desirable or even necessary for the tag construction element to store and communicate additional data, such as parameters or even program instructions to be read and used or executed by the function construction elements.

Figure 8:
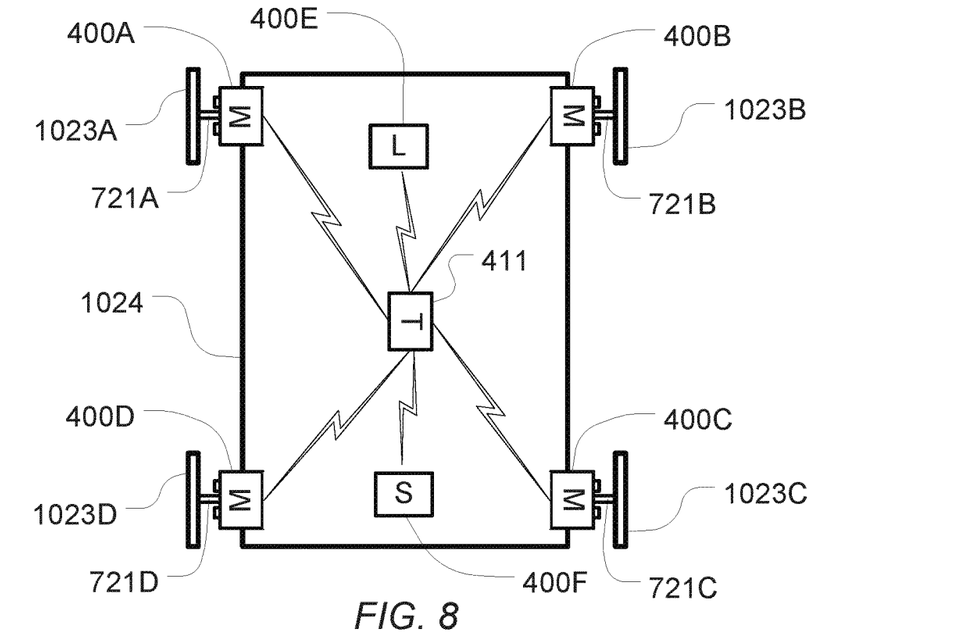
FIG. 8 schematically illustrates another embodiment of a toy construction model constructed from toy construction elements and, in particular, function construction elements and a tag construction element.
Figure 9:
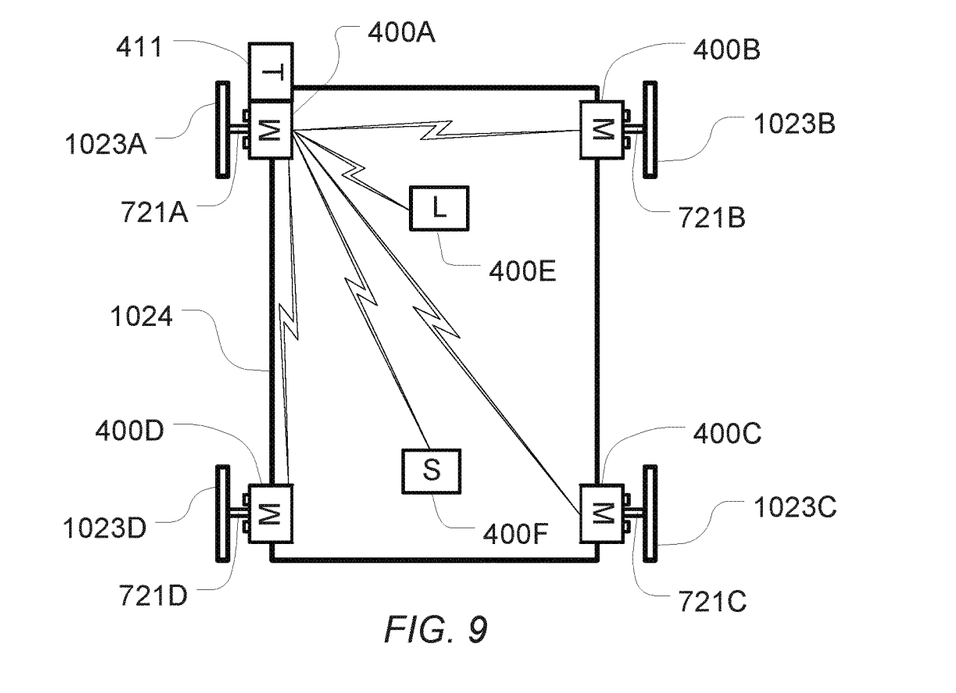
FIG. 9 schematically illustrates yet another embodiment of a toy construction model constructed from toy construction elements and, in particular, function construction elements and a tag construction element.

FIGS. 8-9 illustrate examples of toy construction models constructed from a toy construction system as described herein. In particular, the toy construction models include a plurality of function construction elements 400A-F, e.g. as described in connection with FIGS. 4A-B. While not necessarily explicitly shown in FIGS. 8-9 for ease of illustration, it will be appreciated that examples of toy construction models may include further toy construction elements, including toy construction elements other than function construction elements, such as non-electronic toy construction elements, e.g. as described in connection with FIGS. 1-3.

In the examples of FIGS. 8-9, the toy construction model is a vehicle, such as a car, but it will of course be appreciated that toy construction models representing other items may be constructed. The toy construction model is constructed from a plurality of conventional toy construction elements 1024, 1023A-D and 721A-D, respectively, and from a number of function construction elements 400A-F. In particular, each of the function construction elements 400A-D includes a motor for driving a wheel 1023A-D, respectively, via a corresponding shaft 721A-D, respectively. Function construction element 400E includes a light source, e.g. one or more light-emitting diodes (LEDs) and function construction element 400F includes a sound source, e.g. a loudspeaker.

The toy construction model further comprises a tag construction element 411 having stored thereon configuration data representing a behaviour of the toy construction model, e.g. movement patterns of the car, light and sounds simulating a horn, siren, blinking lights of a police car, etc.

In the example of FIG. 8, the tag construction element is attached to toy construction element 1024 which forms part of the chassis of the car. The tag construction element 411 is configured to directly broadcast the configuration data to all function construction elements 400A-F. To this end, the tag construction element may include a wireless transmitter for transmitting data that can be received by respective transceivers of the function construction elements, e.g. as described in connection with transceiver 406 of the function construction element shown in FIG. 4A.

In the example of FIG. 9, the tag construction element is 411 is attached to one of the function construction elements, in this specific example function construction element 400A. It will be appreciated, however, that the tag construction element may alternatively be attached to one of the other function construction elements or attached to one of the other toy construction elements, adjacent to one of the function construction elements.

In any event, in the example of FIG. 9, the function construction element 400A to which the tag construction element 411 is attached reads out the configuration data from the tag construction element, e.g. via an ultra-short-range data exchange as described in connection with FIGS. 4A-B. The function construction element 400A controls its own function device based on the configuration data. Moreover, the function construction element 400A transmits the configuration data to the remaining function construction elements 400B-F of the toy construction model, e.g. via a short-range wireless communication link, e.g. as described in connection with FIG. 4A-B. The remaining function construction elements 400B-F thus also control their respective function devices based on the configuration data from the tag construction element 411.

In the examples of FIGS. 8-9 all function construction elements 400A-F receive the configuration data that is stored on the tag construction element 411 and control their respective function devices based on the received configuration data. For example, the configuration data may be indicative of a "car" behaviour, causing the motors of function construction elements 400A-D to rotate concurrently and in the forward direction of the car, causing function element 400E to simulate headlights and the function element 400F to simulate an engine sound. If the configuration data is indicative of a "police car" behaviour, the function element 400E may simulate a flashing emergency lighting and the function element to simulate a police siren.

In the examples of FIGS. 8 and 9, any of the function construction elements may be removed from the model or replaced by others. In particular, even upon such removal, the remaining function construction elements may still control their respective function devices based on the received configuration data. In the example of FIG. 9, if the user removes function construction element 400A without replacing it with another function construction element, the tag construction element 411 may have to be repositioned so as to position it in sufficient proximity of one of the other function construction elements remaining in the model. In any event, it is an interesting feature of embodiments of the system described herein that there is no need for a special central control unit to be present in the model which controls the remaining function devices.

Embodiments of the control circuits of the function construction elements described herein can be implemented by means of hardware comprising several distinct elements, and/or at least in part by means of a suitably programmed microprocessor.

In the claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A toy construction system comprising a plurality of toy construction elements, the plurality of toy construction elements including a plurality of function construction elements, the toy construction elements being configured to be detachably interconnected with each other so as to form a toy construction model, the toy construction model comprising at least a subset of the plurality of function construction elements, the subset including more than one function construction elements; each function construction element comprising a function device adapted to perform a user-perceptible function, wherein the toy construction system further comprises a tag construction element;

wherein the tag construction element and the function construction elements are configured for communication of configuration data from the tag construction element to each of the subset of function construction elements when the tag construction element is in a proximity of at least a first function construction element of the subset, and wherein the function construction elements of the subset are each configured to control their respective function devices responsive to the communicated configuration data; wherein the tag construction element is a passive tag construction element comprising a memory for storing the configuration data and circuitry configured to be read out by at least the first function construction element responsive to an interrogation signal from the first function construction element for energizing the tag construction element, wherein the tag construction element is configured to communicate the configuration data to a first function construction element of the subset; and wherein the first function construction element is configured to forward the configuration data to the other function construction elements of the subset, wherein the first function construction element is configured to detect the other function construction elements included in the toy construction model and to selectively communicate the configuration data to all detected function construction elements included in the toy construction model.

2. The toy construction system according to claim 1, wherein the tag construction element is detachably connectable to one or more of the toy construction elements of the toy construction model, and the tag construction element and the function construction elements are configured for communication of configuration data from the tag construction element to each of the subset of function construction elements when the tag construction element is connected to a toy construction element of the toy construction model.

3. The toy construction system according to claim 1, wherein the configuration data is model configuration data representing a behaviour of the toy construction model as a whole; and wherein the function construction elements of the subset are configured to determine a respective element-specific behaviour of the individual function construction elements of the subset based on the received configuration data.

4. The toy construction system according to claim 3, wherein each function construction element of the subset is configured to determine an element-specific behaviour based on the model configuration data and on one or more element-specific parameters specific to a respective function construction element.

5. The toy construction system according to claim 1, wherein each function construction element of the subset is operable to perform at least one autonomous user-perceptible function, regardless of which other function construction elements are included in the subset, the autonomous function depending on the configuration data.

6. The toy construction system according to claim 1, wherein the tag construction element and/or the function construction elements are configured, when a new function construction element is added to the toy construction model, to communicate the configuration data to the new function construction element, and wherein the new function construction element is configured to control the function device of said new function construction element responsive to the communicated configuration data.

7. The toy construction system according to claim 1, wherein, when any function construction element is removed from the toy construction model, the remaining function construction elements of the subset are configured to continue controlling their respective function devices responsive to the configuration data.

8. The toy construction system according to claim 1, wherein the function construction elements are configured to control their respective function devices responsive to the communicated configuration data only as long as the tag construction element is within a proximity of at least one function construction element of the subset.

9. The toy construction system according to claim 1, wherein the function construction elements of the subset are configured to continue basing control of their respective function devices on the communicated configuration data regardless of whether the tag construction element remains in the proximity of at least one of the tag construction elements of the subset.

10. A toy construction system comprising a plurality of toy construction elements, the plurality of toy construction elements including a plurality of function construction elements, the toy construction elements being configured to be detachably interconnected with each other so as to form a toy construction model, the toy construction model comprising at least a subset of the plurality of function construction elements, the subset including more than one function construction elements; each function construction element comprising a function device adapted to perform a user-perceptible function, wherein the toy construction system further comprises a tag construction element;

wherein the tag construction element and the function construction elements are configured for communication of configuration data from the tag construction element to each of the subset of function construction elements when the tag construction element is in a proximity of at least a first function construction element of the subset, and wherein the function construction elements of the subset are each configured to control their respective function devices responsive to the communicated configuration data; wherein the tag construction element is a passive tag construction element comprising a memory for storing the configuration data and circuitry configured to be read out by at least the first function construction element responsive to an interrogation signal from the first function construction element for energizing the tag construction element, wherein the tag construction element is configured to communicate the configuration data to a first function construction element of the subset; and wherein the first function construction element is configured to forward the configuration data to the other function construction elements of the subset, wherein each of the subset of function construction elements is configured to detect the presence of the first construction element as part of the toy construction model, and to selectively control its function device based on received configuration data only when the configuration data has been received from the first construction element detected as being part of the toy construction model.

11. The toy construction system according to claim 10, wherein the tag construction element is detachably connectable to one or more of the toy construction elements of the toy construction model, and the tag construction element and the function construction elements are configured for communication of configuration data from the tag construction element to each of the subset of function construction elements when the tag construction element is connected to a toy construction element of the toy construction model.

12. The toy construction system according to claim 10, wherein the configuration data is model configuration data representing a behaviour of the toy construction model as a whole; and wherein the function construction elements of the subset are configured to determine a respective element-specific behaviour of the individual function construction elements of the subset based on the received configuration data.

13. The toy construction system according to claim 12, wherein each function construction element of the subset is configured to determine an element-specific behaviour based on the model configuration data and on one or more element-specific parameters specific to a respective function construction element.

14. The toy construction system according to claim 10, wherein each function construction element of the subset is operable to perform at least one autonomous user-perceptible function, regardless of which other function construction elements are included in the subset, the autonomous function depending on the configuration data.

15. The toy construction system according to claim 10, wherein the tag construction element and/or the function construction elements are configured, when a new function construction element is added to the toy construction model, to communicate the configuration data to the new function construction element, and wherein the new function construction element is configured to control the function device of said new function construction element responsive to the communicated configuration data.

16. The toy construction system according to claim 10, wherein, when any function construction element is removed from the toy construction model, the remaining function construction elements of the subset are configured to continue controlling their respective function devices responsive to the configuration data.

17. The toy construction system according to claim 10, wherein the function construction elements are configured to control their respective function devices responsive to the communicated configuration data only as long as the tag construction element is within a proximity of at least one function construction element of the subset.

18. The toy construction system according to claim 10, wherein the function construction elements of the subset are configured to continue basing control of their respective function devices on the communicated configuration data regardless of whether the tag construction element remains in the proximity of at least one of the tag construction elements of the subset.

19. A toy construction system comprising:
a plurality of toy construction elements, the plurality of toy construction elements including a plurality of function construction elements, the toy construction elements being configured to be detachably interconnected with each other so as to form a toy construction model, the toy construction model comprising at least a subset of the plurality of function construction elements, the subset including more than one function construction elements, each function construction element comprising a function device adapted to perform a user-perceptible function; and
a passive tag construction element comprising a memory for storing configuration data and circuitry configured to be read out by at least a first function construction element of the subset responsive to an interrogation signal from the first function construction element for energizing the tag construction element,
wherein:
the tag construction element and the function construction elements are configured for communication of configuration data from the tag construction element to each of the subset of function construction elements when the tag construction element is in a proximity of at least the first function construction element of the subset,
the function construction elements of the subset are each configured to control their respective function devices responsive to the communicated configuration data,
the tag construction element is configured to communicate the configuration data to the first function construction element,
the first function construction element is configured to forward the configuration data to the other function construction elements of the subset, and
the first function construction element further comprises an element detection circuit operable to detect other function construction elements in the same toy construction model as function construction element, the detection based on correlated movement of the function construction elements of the subset.

\* \* \* \* \*